United States Patent [19]
Lee et al.

[11] Patent Number: 5,748,036
[45] Date of Patent: May 5, 1998

[54] NON-COHERENT DIGITAL FSK DEMODULATOR

[75] Inventors: Tsai-Pao Lee, Kaohsiung; Kwang-Cheng Chen, Taipei; Chin-Lin Yang, Hsinchu, all of Taiwan

[73] Assignee: United Microelectronics Corporation, Hsinchu, Taiwan

[21] Appl. No.: 688,429

[22] Filed: Jul. 30, 1996

[51] Int. Cl.$^6$ .................................................. H04L 27/148
[52] U.S. Cl. ........................... 329/300; 329/302; 375/328; 375/334; 375/335
[58] Field of Search ................................. 329/300, 301, 329/302, 303; 375/324, 328, 334, 335

[56] References Cited

U.S. PATENT DOCUMENTS

| | | | |
|---|---|---|---|
| 5,065,409 | 11/1991 | Hughes et al. | 329/300 |
| 5,420,888 | 5/1995 | Davis et al. | 329/300 |

*Primary Examiner*—Siegfried H. Grimm
*Attorney, Agent, or Firm*—Ladas & Parry

[57] ABSTRACT

A non-coherent frequency shift keying (FSK) demodulator, for receiving a N-ary FSK modulated input signal, demodulating the signal to obtain output data, in which the N-ary FSK modulation has N symbols, and the output data is constructed by a plurality of symbol intervals. The demodulator includes an A/D converter for converting the input signal in digital form, in which, for the A/D converter sampling, a sampling number M of every symbol interval satisfies an equation $M \geq 2K+1$, wherein K is the interval number of a carrier of the input signal in each symbol interval. N filter arrays each respectively receive the input signals in digital form, and each one of the N filter arrays has a filtering frequency band, respectively, corresponding to spectrums of N symbols in N-ary FSK modulation. N downsamplers each receive the input signal from the corresponding filter array and reduce the sampling number of the input signal to make each symbol interval include only one sample value. N absolute-value generators each receive the input signal from the corresponding downsampler and calculate the absolute value of the sample value of the input signal. A maximum detector receives the outputs of the absolute value generators and detects the maximum in the outputs to decide the symbols represented by each symbol interval, so as to output data.

25 Claims, 4 Drawing Sheets

5,748,036

NON-COHERENT DIGITAL FSK DEMODULATOR

BACKGROUND OF THE INVENTION

1. Field of the invention

The present invention relates to a communication system, and, more particularly, to a non-coherent demodulator for receiving frequency shift keying (FSK) modulated signals, and the digital signal processing method employed.

2. Description of prior art

The main function of a communication system is to transmit data between the transmitter and the receiver. The data being transmitted is generally in modulated form, that is, the data is modulated at the transmitter and demodulated at the receiver. In the process of modulation, the data, which is desired to be transmitted, is used to change one signal characteristic of the carrier wave. For a digital communication system, the signal characteristics of the carrier wave that can be modulated are amplitude, frequency and phase, which are generally known as amplitude shift keying (ASK), frequency shift keying (FSK) and phase shift keying (PSK), respectively.

There are several widely used demodulating methods. One method is a coherent demodulation method which mixes the received signal and a local oscillating signal synchronized with the carrier wave, and then uses integrators and threshold detectors to find the original digital data. This demodulating method has a reduced error rate but is difficult to use since the process of synchronizing the local oscillating signal and the carrier wave must be done by a phase-lock loop. Moreover, the additional phase-lock loop circuit increases the manufacturing cost and complicates the structure of the receiver. Another method is a non-coherent demodulating method. There are some impulses present in the spectrum of the signal modulated by FSK modulation, wherein the number of the impulses and the number of the symbols modulated by FSK modulation are the same. The non-coherent demodulating method filters the frequency band represented by the symbols by using a band filter, and finds the original digital data by a waveform detector and threshold detector.

FIG. 1 is a diagram illustrating the block architecture of a prior-art non-coherent demodulation receiver. Received signal r(t) is a binary FSK modulated signal, the centers of the frequency bands represented by two symbols are represented by $f_1$ and $f_2$, respectively. Band-pass filters 10 and 12 filter out two frequency bands in which the central frequencies are $f_1$, and $f_2$, respectively. The symbol data corresponding to each band are sent to adder 18 after being detected in the waveforms by waveform detectors 14 and 16. Adder 18 adds the first symbol data from waveform detector 14 with the inverted second symbol data from waveform detector 16, and the result is kept in sampler circuit 20. Threshold detector 22 detects accurate data a(t) from the adding result. This process is called a non-coherent demodulation since the demodulating process does not involve the processing of carrier synchronization.

However, the architecture of the two receivers mentioned above, that is, the coherent type and the non-coherent types, process analog signals, and are therefore not suitable for digital integrated circuits. On the other hand, the rapid development of digital signal processing techniques has led to increasing demand for a digital demodulator circuit.

SUMMARY OF THE INVENTION

Accordingly, the primary object of the present invention is to provide a non-coherent FSK demodulator with a circuit architecture that only performs digital functions and is suitable for fabrication in a digital integrated circuit to avoid the complexity and sensitivity problems of the circuit encountered while manufacturing a conventional analog circuit.

Another object of the present invention is to provide a non-coherent FSK demodulator which has a lower error rate than a conventional non-coherent FSK demodulator.

Still another object of the present invention is to provide a non-coherent FSK demodulator which is easier to combine with the equalizers implemented in the form of transversal or tap-delay line filters to reduce the number of tap-delay elements and improve performance.

It is still another object of the present invention to provide a signal processing method which uses A/D converters and filter banks to process signals, so that a signal being FSK modulated can be demodulated.

To achieve the above objects, the present invention provides a non-coherent FSK demodulator to receive a N-ary FSK modulated input signal, and demodulate the modulated signal to obtain the output data. The N-ary FSK modulation is provided with N symbols, and the input signal is constructed by a plurality of symbol intervals. The demodulator includes an A/D converter for converting the input signal into digital form, in which, for the A/D converter sampling the signal, the sampling number M of each symbol interval satisfies the equation $M \geq 2K+1$ (i.e., M is larger than or equal to $2K+1$), wherein K is the interval number of the input signal carrier in each symbol interval. N filter arrays each respectively receive the input signals in digital form. Each one of the N filter arrays has a filtering frequency band, respectively, corresponding to spectrums of N symbols in N-ary FSK modulation. N downsamplers each receive the input signal from the corresponding filter array and reduce the sampling number of the input signal to make each symbol interval include only one sample value. N absolute value generators each receive the input signal from the corresponding downsampler and calculate the absolute value of the sample value of the input signal. A maximum detector receives the outputs of the absolute value generators and detects the maximum in the outputs to decide the symbols represented by each symbol interval, so as to output data.

Moreover, the present invention provides a signal processing method for demodulating a N-ary FSK modulated input signal to obtain the output signal, in which the N-ary FSK modulation is provided with N symbols, the input signal is constructed by a plurality of symbol intervals, and each symbol interval has a symbol. The method includes digitizing the input signal, wherein the sampling number M in each symbol interval satisfies the equation $M \geq 2K+1$, wherein K is the number of the interval of the input signal carrier in each symbol interval. The input signal is filtered by the spectrums of N symbols of N-ary FSK modulation, respectively. The sample value is reduced in each symbol interval, respectively, for each input signal after filtering, to make only one sample value be contained therein. The absolute value of the sample value contained in each symbol interval for the input signal is computed after reducing the sample value. The symbol represented by each symbol interval is decided according to the sample value after computing the absolute value to obtain the output data.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 1:
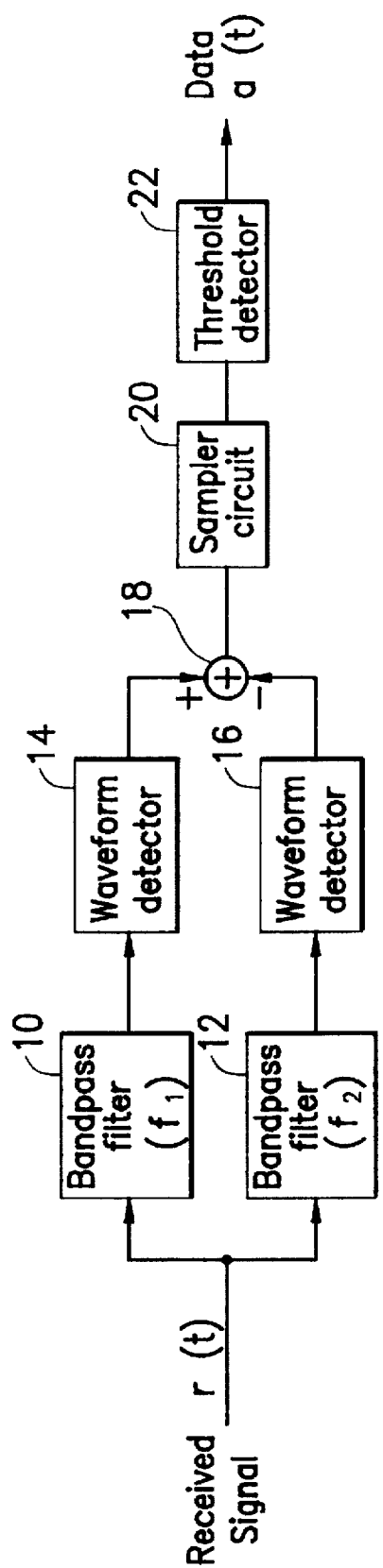
FIG. 1 is a diagram illustrating the architecture of a conventional non-coherent FSK demodulator.
Figure 2:
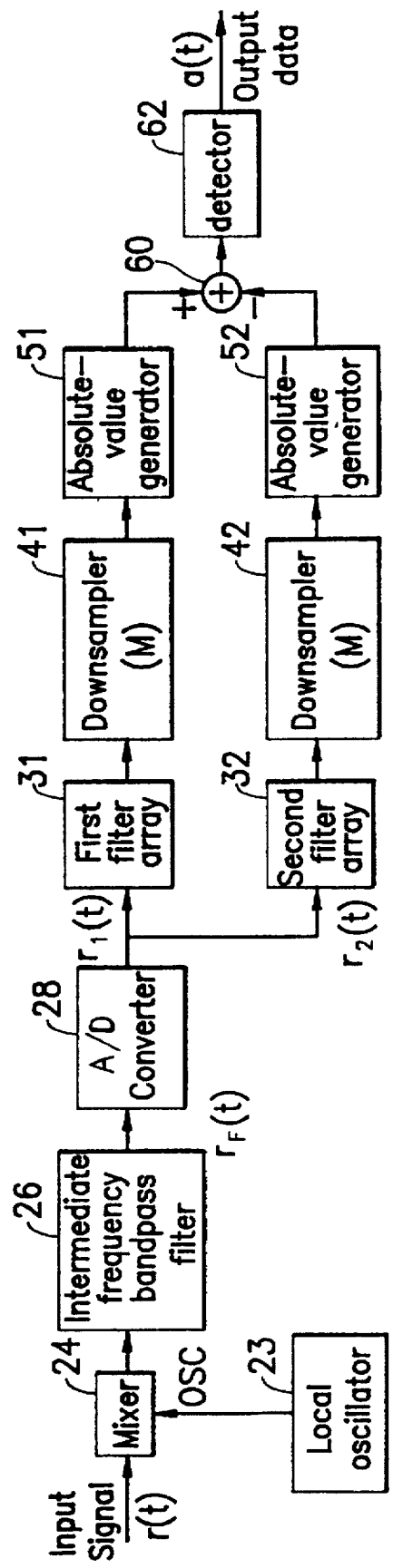
FIG. 2 is a diagram illustrating the architecture of a non-coherent binary FSK demodulator according to the present invention.

Referring to FIG. 2, which is a diagram illustrating the architecture of a non-coherent binary FSK demodulator according to the present invention. Input signal r(t) is an analog signal modulated by binary FSK, which can be divided into several time slots. In each time slot, the variations of the carrier frequency can be used to represent two different FSK symbols. In FIG. 2, input signal r(t) and signal OSC of local oscillator 23 are mixed in mixer 24. The frequency of the signal generated from mixer 24 is the addition and the subtraction of the frequency of input signal r(t) and the frequency of local oscillator signal OSC. Signal $r_r(t)$ can be obtained by being filtered through intermediate frequency bandpass filter 26 having a center frequency $f_{IF}$, which is the difference. Therefore, the carrier frequency of input signal $r_r(t)$ is the intermediate frequency $f_{IF}$, which is lower than the carrier frequency of input signal r(t), to reduce the sampling velocity needed in the subsequent digital processing procedures.

To digitize the whole demodulating process, input signal $r_F(t)$ is converted into digital form after sampling by A/D converter 28. The intermediate frequency $f_{IF}$ is assumed to equal K/T, in which T represents a symbol interval, and K represents the interval number of the carrier frequency of the intermediate frequency in each symbol interval; and each sampling time TS equals T/M, in which M represents the sampling number in each symbol interval. According to sampling theory, the parameters M and K have the following relationship:

$$M \geq 2K+1 \quad (1)$$

Hence, assuming that the symbol interval remains unchanged, then the value of K decreases as the carrier frequency (here, the intermediate frequency $f_{IF}$) drops. According to equation (1), the lower limit of the value of the parameter M also drops, so that the sampling velocity can be reduced. The advantage of reducing the sampling velocity is to avoid high-speed operation of the circuit and thus, to reduce the complexity of the digital circuit.

The input signals in digital form $r_1(t)$ and $r_2(t)$ respectively serve as the test signals of the first symbol and the second symbol for binary FSK. Take signal $r_1$, (t) for example, first, the component of the first symbol in signal $r_1(t)$ is filtered by first filter array 31 having a center frequency $f_1$, then the number of sampling value in each symbol interval is reduced to 1 by downsampler 41 to simplify the subsequent processing. After the absolute value is computed by absolute-value generator 51, the data is sent to a first input of operator 60. Input signal $r_2(t)$ serves as the test signal for the second symbol, and after being processed by second filter array 32, downsampler 42 and absolute-value generator 52, the data is sent to the second input of operator 60. Operator 60 calculates the signal difference between the first input and the second input, and compares the signal difference with a threshold by detector 62. Generally, the threshold can be set to 0, then output data a(t) is the first symbol while the output of operator 60 is larger than 0, otherwise, the output data is the second symbol.

Since the signal processed by first filter array 31 and second filter array 32 is a digital signal, the object of the present invention can be achieved by a short-time Fourier transform or discrete-time wavelet transform.

Figure 3:
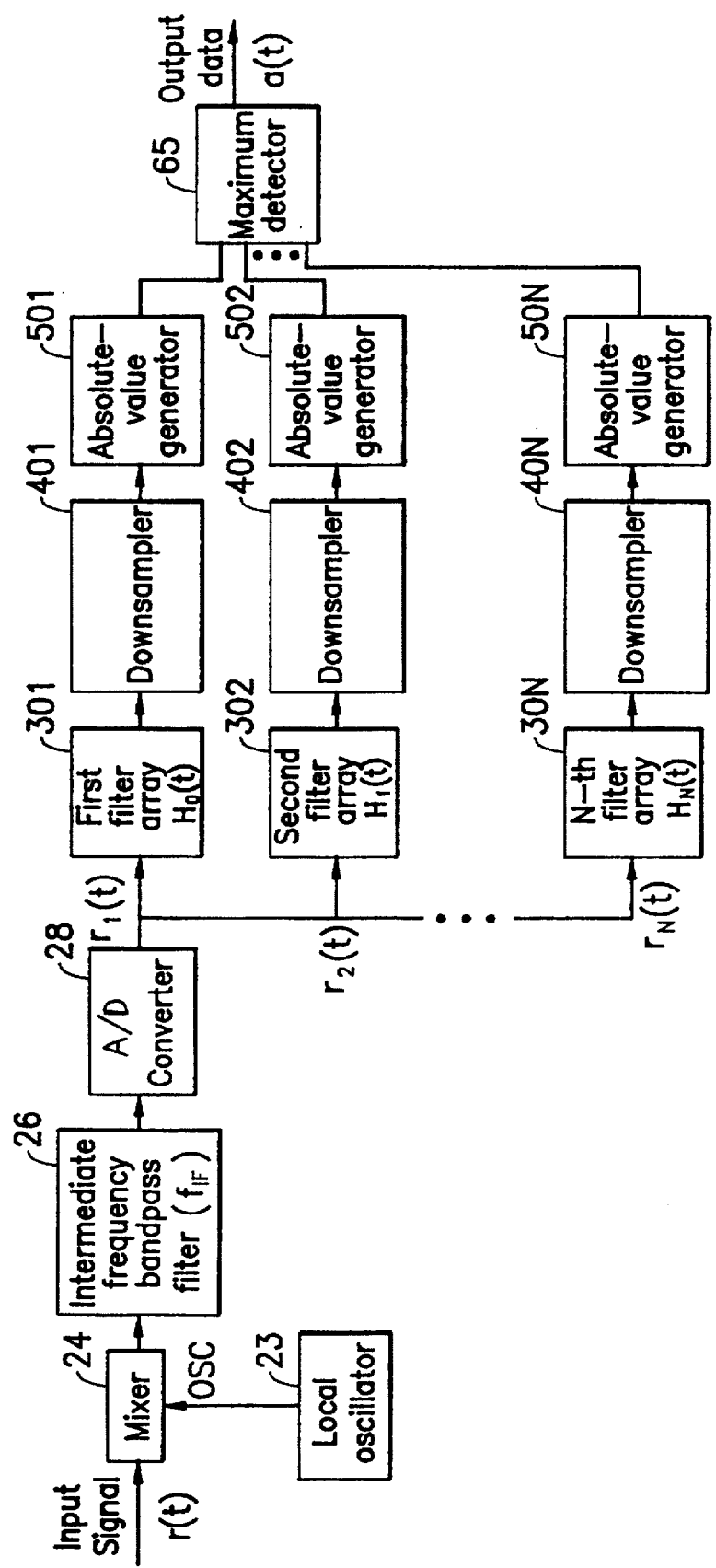
FIG. 3 is a diagram illustrating the architecture of a non-coherent N-ary FSK demodulator according to the present invention.

FIG. 3 is a diagram illustrating the architecture of a non-coherent N-ary FSK demodulator according to the present invention. Basically, FIG. 3 is a further illustration of FIG. 2, in which identical components are indicated by identical reference numbers. The N symbols of N-ary FSK are processed by filter arrays 301 to 30N, downsamplers 401 to 40N, and absolute-value generators 501 to 50N, respectively, according to the same theory mentioned above. Then maximum detector 65 selects the symbol represented by the maximum to serve as output data a(t). Maximum detector 65 can be a known comparator.

Figure 4:
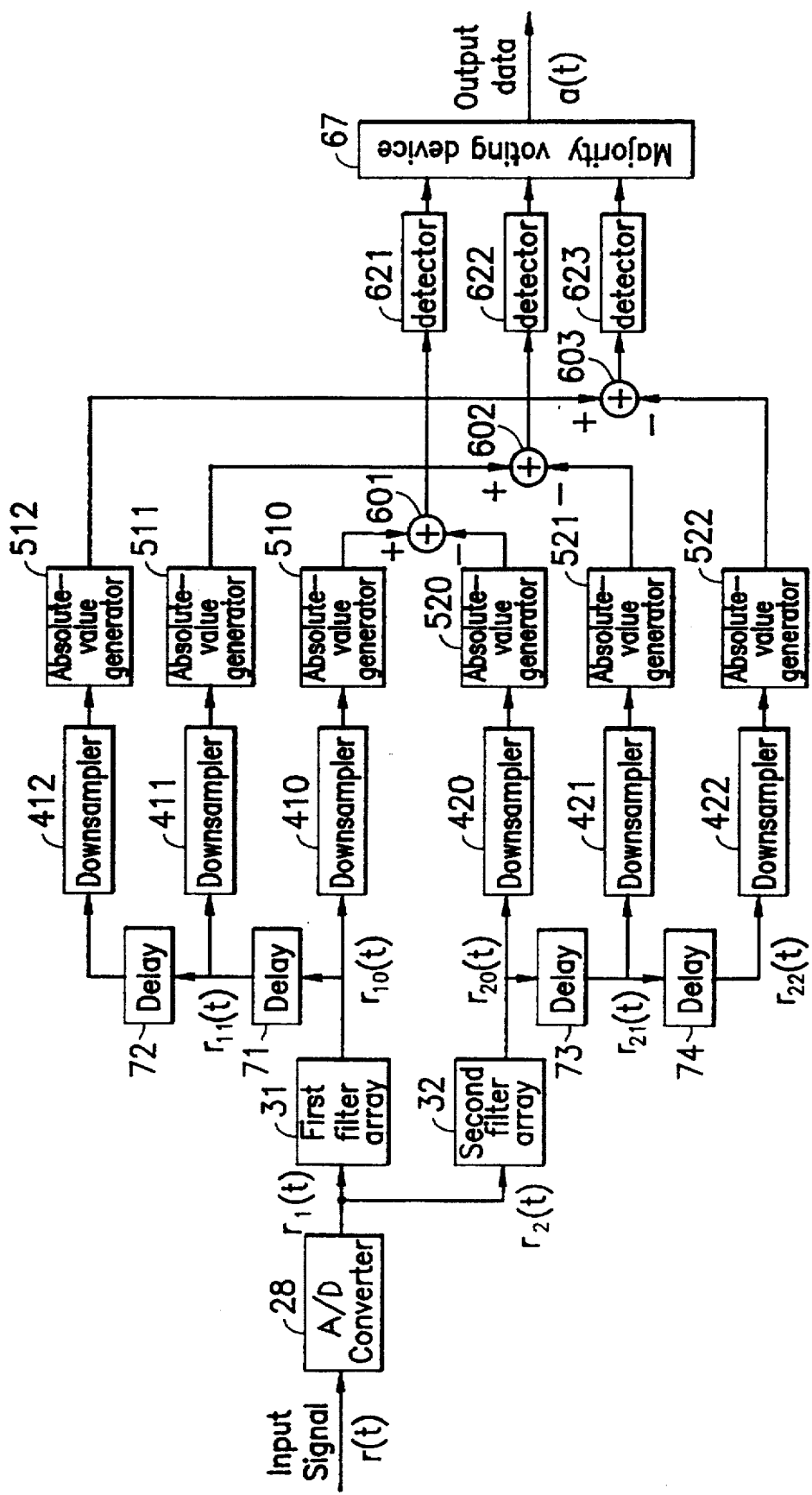
FIG. 4 is a diagram illustrating the architecture of a demodulator according to the present invention, which uses majority voting to reduce the error rate.

The architecture of the present invention can utilize majority voting to raise the correction rate of output data a(t). FIG. 4 is a diagram illustrating the architecture of a demodulator according to the present invention, which utilizes majority voting to lower the error rate. The components identical to FIG. 2 are indicated by identical reference numbers. Delay units 71 and 72 are used to delay digital input signal $r_{10}(t)$ and form $r_{11}(t)$ and $r_{12}(t)$ with a delayed sample time $T_s$, and delay units 73 and 74 are used to delay digital input signal $r_{20}(t)$ and form $r_{21}(t)$ and $r_{22}(t)$ Signals $r_{10}(t)$, $r_{11}(t)$, $r_{12}(t)$, $r_{20}(t)$, $r_{21}(t)$ and $r_{22}(t)$ are then sequentially processed by downsamplers 410 to 412 and 420 to 422, and absolute-value generators 510 to 512 and 520 to 522, respectively. Then the input signals having the same delay time are processed by operators 601 to 603 and detectors 621 to 623 for determining the demodulated data in the case of different delay times. Since the correct data is the majority of the data resulting from detectors 621 to 623, a majority voting device is used to determine output data a(t).

Referring further to FIG. 4, which illustrates a scheme using only four delays, however, an even number of delays can be used in practice. In the case of P delays being used, the first to (P/2)-th delay can be serially connected to the output of first filter 31 sequentially, the (P/2+1)-th to P-th delay can be serially connected to the output of second filter 32 sequentially, to respectively produce relative delay signals. Then the relative delay signals are processed by (P+2) downsamplers, (P+2) absolute-value generators, (P/2+1) operators and (P/2+1)detectors. Majority voting device 67 should preferably have an odd number of inputs to avoid malfunctioning since this embodiment is a secondary FSK demodulator. Therefore, P should be a multiple of four.

The present invention displays the following advantages:

1. The present invention uses complete digital demodulation, so that a FSK demodulator constructed according to the present invention can be formed in a common digital signal processing chip.
2. The present invention provides an FSK demodulator which utilizes majority voting to effectively reduce bit error rate (BER).
3. The demodulator can be effectively combined with other digital devices such as an equalizer since it involves digital processing.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A non-coherent frequency shift keying demodulator, for receiving a N-ary FSK modulated input signal, demodulating the signal to obtain output data, in which the N-ary FSK modulation has N symbols, and the output data is constructed by a plurality of symbol intervals, the demodulator comprising:

an A/D converter for converting the input signal into digital form, in which, for the A/D converter sampling, a sampling number M of every symbol interval satisfies an equation $M \geq 2K+1$, wherein K is the interval number of a carrier of the input signal in each symbol interval;

N filter arrays, wherein each filter array respectively receives the input signals in digital form, and each one of the N filter arrays has a filtering frequency band, respectively, corresponding to the spectrums of N symbols in N-ary FSK modulation;

N downsamplers, wherein each downsampler receives the input signal from the corresponding filter array and reduces the sampling number of the input signal to make each symbol interval include only one sample value;

N absolute-value generators, wherein each absolute value generator receives the input signal from the corresponding downsampler and calculates the absolute value of the sample value of the input signal; and a maximum detector for receiving the outputs of the absolute value generators and detecting the maximum in the outputs to decide the symbols represented by each symbol interval, so as to output data.

2. A demodulator as claimed in claim 1, further comprising:

a mixer for mixing the input signal and a local oscillator signal to lower the carrier frequency of the input signal to an intermediate frequency; and an intermediate frequency filter, the center of the frequency band of the intermediate frequency filter being the intermediate frequency, for receiving the input signal transmitted from the mixer, and transmitting the input signal to the A/D converter.

3. A demodulator as claimed in claim 1, wherein each filter array is based on a short-time Fourier transform to perform the filtering function.

4. A demodulator as claimed in claim 1, wherein each filter array is based on a discrete-time wavelet transform to perform the filtering function.

5. A demodulator as claimed in claim 2, wherein each filter array is based on a short-time Fourier transform to perform the filtering function.

6. A demodulator as claimed in claim 2, wherein each filter array is based on a discrete-time wavelet transform to perform the filtering function.

7. A non-coherent FSK demodulator, for receiving a binary FSK modulated input signal, demodulating the signal to obtain output data, in which the binary FSK modulation has a first symbol and a second symbol, and the output data includes a plurality of symbol intervals, the demodulator comprising:

an A/D converter for converting the input signal into digital form, in which, for the A/D converter sampling, a sampling number M of every symbol interval satisfies an equation $M \geq 2K+1$, wherein K is the interval number of a carrier of the input signal in each symbol interval;

a first filter array, for receiving the input signal in digital form, wherein the frequency band of the first filter array includes a spectrum of the first symbol in binary FSK modulation;

a first downsampler, for receiving the input signal transmitted from the first filter array and reducing the sampling number of the input signal to make every symbol interval include only one sample value;

a first absolute-value generator, for receiving the input signal from the first downsampler and calculating the absolute value of the sample value of the input signal;

a second filter array, for receiving the input signal in digital form, and the frequency band of the second filter array including a spectrum of the second symbol in binary FSK modulation;

a second downsampler, for receiving the input signal transmitted from the second filter array and reducing the sampling number of the input signal to make every symbol interval include only one sample value;

a second absolute-value generator, for receiving the input signal from the second downsampler and calculating the absolute value of the sample value of the input signal;

an operator for receiving the input signals transmitted from the first absolute-value generator and the second absolute-value generator and calculating a difference therebetween;

a detector for receiving the output of the operator and deciding upon the symbols represented by every symbol interval, so as to obtain an output signal.

8. A demodulator as claimed in claim 7, further comprising:

a mixer for mixing the input signal and a local oscillator signal to lower the carrier frequency of the input signal to an intermediate frequency;

an intermediate frequency filter, the center of the frequency band thereof being the intermediate frequency, for receiving the input signal transmitted from the mixer, and transmitting the input signal to the A/D converter.

9. A demodulator as claimed in claim 7, wherein the first filter array utilizes a short-time Fourier transform to perform the filtering function.

10. A demodulator as claimed in claim 7, wherein the first filter array utilizes a discrete-time wavelet transform to perform the filtering function.

11. A demodulator as claimed in claim 7, wherein the second filter array utilizes a short-time Fourier transform to perform the filtering function.

12. A demodulator as claimed in claim 7, wherein the second filter array utilizes a discrete-time wavelet transform to perform the filtering function.

13. A demodulator as claimed in claim 8, wherein the first filter array utilizes a short-time Fourier transform to perform the filtering function.

14. A demodulator as claimed in claim 8, wherein the first filter array utilizes a discrete-time wavelet transform to perform the filtering function.

15. A demodulator or as claimed in claim 8, wherein the second filter array utilizes a short-time Fourier transform to perform the filtering function.

16. A demodulator as claimed in claim 8, wherein the second filter array utilizes a discrete-time wavelet transform to perform the filtering function.

17. A non-coherent frequency shift keying demodulator, for receiving a binary FSK modulated input signal, demodulating the signal to obtain output data, in which the binary FSK modulation has a first symbol and a second symbol, and the output data comprises a plurality of symbol intervals, the demodulator comprising:

an A/D converter for converting the input signal into digital form, in which, for the A/D converter sampling, a sampling number M of every symbol interval satisfies an equation $M \geq 2K+1$, wherein K is the interval number of a carrier of the input signal in each symbol interval;

a first filter array, for receiving the input signal in digital form, wherein the frequency band of the first filter array includes a spectrum of the first symbol in binary FSK modulation;

a second filter array, for receiving the input signal in digital form, wherein the frequency band of the second filter array includes a spectrum of the second symbol in binary FSK modulation;

P delay units, in which the first to the (p/2)-th delay units are serially connected to the output of the first filter array to generate first to (p/2)-th delay signals, and the (p/2+1)-th to the p-th delay units are serially connected to the output of the second filter array to generate (p/2+1)-th to p-th delay signals;

(p+2) downsamplers, in which the first to the (p/2+1)-th downsamplers respectively receive the input signal transmitted from the first filter array and the first to (p/2)-th delay signals, and the (p/2+2)-th to the (p+2)-th downsamplers respectively receive the input signal transmitted from the second filter array and the (p/2+1)-th to the p-th delay signals, and each downsampler is used to reduce the sample number of the input signal related thereto, so that each time slot merely includes one sample value;

(p+2) absolute-value generators, in which the inputs of the first to the(p/2+1)-th absolute-value value generators are respectively coupled to the outputs of the first to the (p/2+1)-th downsamplers, the inputs of the (p/2+2)-th to the (p+2)-th absolute-value generators are respectively coupled to the outputs of the (p/2+2)-th to (p+2)-th downsamplers, and each absolute-value generator is used to calculate the absolute value of the input signal related thereto;

(p/2+1) operators, in which the first inputs of the operators are respectively coupled to the outputs of the first to the (p/2+1)-th absolute-value generators, and the second inputs of the operators are respectively coupled to the outputs of the (p/2+2)-th to the (p+2)-th absolute-value generators, and each operator is used to calculate the difference of the first input and the second input thereof and transmits the difference to the output thereof;

(p/2+1) threshold detectors, in which the inputs of the first to the (p/2+1)-th threshold detectors are respectively coupled to the outputs of the first to the (p/2+1)-th operators to decide whether the input signal of each threshold detector is larger than a threshold or not;

a majority voting device for outputting data, in which the data is the same as major outputs from the (p/2+1) threshold detectors.

18. A demodulator as claimed in claim 17, further comprising:

a mixer for mixing the input signal and a local oscillator signal to lower the carrier frequency of the input signal to an intermediate frequency;

an intermediate frequency filter, the center of the frequency band thereof being the intermediate frequency, for receiving the input signal transmitted from the mixer, and transmitting the input signal to the A/D converter.

19. A demodulator as claimed in claim 17, wherein p is a multiple of 4.

20. A signal processing method for demodulating a N-ary FSK modulated input signal to obtain output data, in which the N-ary FSK modulation has N symbols, and the input signal includes a plurality of symbol intervals, wherein each symbol interval has a symbol, the method comprising the steps of:

digitizing the input signal, wherein a sample number in each symbol interval satisfies an equation $M \geq 2K+1$, wherein K is the interval number of a carrier of the input signal in each symbol interval;

filtering the input signal by the spectrums of the N symbols of the N-ary FSK modulation, respectively;

lowering the sample value in each symbol interval for the input signal after filtering, so that merely one sample value is included therein;

calculating the absolute value of the sample value included in each symbol interval for the input signal which has the sample value thereof lowered; and deciding the symbols represented by each symbol interval according to the sample value which has the absolute value thereof calculated, so as to obtain output data.

21. A signal processing method as claimed in claim 20, further comprising the step of:

before the step of digitizing the input signal, reducing the carrier frequency of the input signal to an intermediate frequency by mixing.

22. A signal processing method as claimed in claim 20, wherein the filtering step is accomplished by a short-time Fourier transform.

23. A signal processing method as claimed in claim 20, wherein the filtering step is accomplished by a discrete-time wavelet transform.

24. A signal processing method as claimed in claim 21, wherein the filtering step is accomplished by a short-time Fourier transform.

25. A signal processing method as claimed in claim 21, wherein the filtering step is accomplished by a discrete-time wavelet transform.

* * * * *